(12) United States Patent
Shintani

(10) Patent No.: US 10,194,132 B2
(45) Date of Patent: Jan. 29, 2019

(54) ESTABLISHING Z-AXIS LOCATION OF GRAPHICS PLANE IN 3D VIDEO DISPLAY

(75) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 2062 days.

(21) Appl. No.: 12/849,167

(22) Filed: Aug. 3, 2010

(65) Prior Publication Data

US 2012/0033052 A1 Feb. 9, 2012

(51) Int. Cl.
| G06F 3/0481 | (2013.01) |
| G06F 3/0482 | (2013.01) |
| G06F 3/0483 | (2013.01) |
| G06T 19/00 | (2011.01) |
| H04N 13/128 | (2018.01) |
| H04N 13/183 | (2018.01) |

(52) U.S. Cl.
CPC ......... *H04N 13/128* (2018.05); *H04N 13/183* (2018.05)

(58) Field of Classification Search
CPC .... G06F 3/0482; G06F 3/0483; G06F 9/4443; G06F 3/04817; G06F 3/04815; G06F 17/30873; G06F 17/30994; H04N 5/44543; G06T 19/00
USPC ........................................ 715/810, 764, 848
See application file for complete search history.

(56) References Cited

U.S. PATENT DOCUMENTS

| 7,075,513 | B2 * | 7/2006 | Silfverberg et al. ........... 345/157 |
| 7,260,789 | B2 * | 8/2007 | Hunleth et al. ............... 715/858 |
| 8,059,094 | B2 * | 11/2011 | Seo et al. ....................... 345/167 |
| 8,111,906 | B2 | 2/2012 | Song et al. |
| 2004/0233222 | A1 * | 11/2004 | Lee et al. ....................... 345/621 |
| 2005/0007370 | A1 | 1/2005 | Hunter et al. |
| 2007/0077541 | A1 * | 4/2007 | Champagne et al. .......... 434/62 |
| 2007/0080306 | A1 | 4/2007 | Lin |
| 2008/0191864 | A1 | 8/2008 | Wolfson |
| 2008/0252661 | A1 | 10/2008 | Hilton |
| 2009/0089689 | A1 | 4/2009 | Clark et al. |
| 2009/0164439 | A1 * | 6/2009 | Nevins ............................. 707/3 |

(Continued)

FOREIGN PATENT DOCUMENTS

| CN | 15355511 | 6/2002 |
| CN | 1893673 | 1/2007 |

(Continued)

OTHER PUBLICATIONS

Eric Karasuda, Sara Mamains, University of California—Berkeley, "Displaying Readable Text in a Head-Tracked, Stereoscopic Virtual Environment", http://akpeters.metapress.com/content/k8j85466351hvxt5/, vol. 12, No. 2, Mar. 7, 2008.

(Continued)

*Primary Examiner* — Kevin L Young
*Assistant Examiner* — Erik Stitt
(74) *Attorney, Agent, or Firm* — John L. Rogitz

(57) ABSTRACT

A television for presenting video content in 3D has a video display controlled by a processor to present video content in a video plane and a user interface (UI) in a graphics plane. The processor receives input indicating a viewer desire to virtually move the UI up or back along a z-axis that is perpendicular to the video plane and responsive to the input change the location of the UI on the z-axis. This may done by altering image disparity produced to create a 3D effect.

12 Claims, 2 Drawing Sheets

(56) References Cited

U.S. PATENT DOCUMENTS

| | | |
|---|---|---|
| 2010/0021141 A1 | 1/2010 | Yamashita et al. |
| 2010/0074594 A1 | 3/2010 | Nakamura et al. |
| 2010/0091012 A1 | 4/2010 | Newton et al. |
| 2010/0169797 A1* | 7/2010 | Lynk et al. ............ 715/757 |
| 2011/0093888 A1* | 4/2011 | Araki et al. ............ 725/37 |
| 2011/0169825 A1 | 7/2011 | Ishiyama et al. |
| 2011/0173554 A1* | 7/2011 | Niles et al. ............ 715/769 |
| 2011/0291945 A1* | 12/2011 | Ewing et al. ............ 345/173 |

FOREIGN PATENT DOCUMENTS

| | | |
|---|---|---|
| CN | 101282492 | 10/2008 |
| CN | 101529364 A | 9/2009 |
| WO | 2010038388 A1 | 4/2010 |
| WO | 2010058362 | 5/2010 |
| WO | 2010058546 | 5/2010 |

OTHER PUBLICATIONS

Renato Capra, "3D Layout Manipulation Functions with a Glance to Optimization Problems", http://portal.acm.org/citation.cfm?id=144052,144075, vol. 23, Issue 1, Jul. 1992.

* cited by examiner

ESTABLISHING Z-AXIS LOCATION OF GRAPHICS PLANE IN 3D VIDEO DISPLAY

I. FIELD OF THE INVENTION

The present application relates generally to establishing the z-axis location of a graphics presentation in a three dimensional (3D) video display.

II. BACKGROUND OF THE INVENTION 3D video such as 3D television is a fast growing technical field. Currently, 3D video is established by presenting two simultaneous views of the same video content marginally offset from each other on the horizontal ("x") axis. The offset may be thought of as a horizontal disparity. The larger the display, the larger the possible horizontal disparity, with a larger disparity producing a more pronounced 3D effect. Viewing a 3D display from a close distance also makes the 3D effect more pronounced than viewing the display from afar.

Because video viewers expect control enhancements such as user interfaces, menus, and the like to carry over to 3D from 2D, 3D video presentation devices must provide, in addition to 3D content, the capability to overlay graphics onto the video content. As mentioned above, however, screen size differences and viewing location differences change the 3D effect and hence there is not an optimal positioning of the graphics in the "z" dimension, i.e., the new, third dimension toward and away from the surface of the display.

SUMMARY OF THE INVENTION

Accordingly, a video display device includes a processor and a video display controlled by the processor. The video display defines a display plane and a z-axis perpendicular to the display plane. The device also includes a user input device communicating with the processor to send user selection signals to the processor. The processor executes logic which includes, responsive to a viewer selection of a user interface (UI), presenting a UI in a graphics plane of the video display device. Responsive to a first command from the user input device, the processor causes the UI to appear to move in a first direction along the z-axis, whereas responsive to a second command from the user input device, the processor causes the UI to appear to move in a second, opposite direction along the z-axis.

In some embodiments the first direction is toward a viewer of the display and the second direction is away from a viewer of the display. The first command thus may be a "move up" command and the second command may be a "move back" command.

In example implementations, in response to the first command the processor increases a disparity between two identical images along an x-axis defined by the display. In response to the second command the processor decreases the disparity. The images defining the disparity may be video content images presented in a video plane of the device, or UI images presented in a graphics plane of the device. In any case, the first and second commands can cause the processor to cause the UI to appear to move incrementally in that the UI moves a fraction of a total distance available for movement of the UI along the z-axis responsive to a single command.

In another aspect, a television for presenting video content in 3D has a video display controlled by a processor to present video content in a video plane and a user interface (UI) in a graphics plane. The processor receives input indicating a viewer desire to virtually move the UI up or back along a z-axis that is perpendicular to the video plane and responsive to the input change the location of the UI on the z-axis.

In another aspect, an apparatus has a video display, a processor configured to receive user input signals, and a non-transitory computer readable storage medium accessible to the processor and bearing instructions to cause the processor to present a user input (UI) pane on the display overlaid on 3D video content. The UI pane presents a "move up" indicator and a "move back" indicator. The indicators are selectable by a viewer manipulating a user input device to thereby generate the user input signals. Responsive to the user input signals, the processor causes the UI pane to appear to change position with respect to a z-axis defined by the display.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
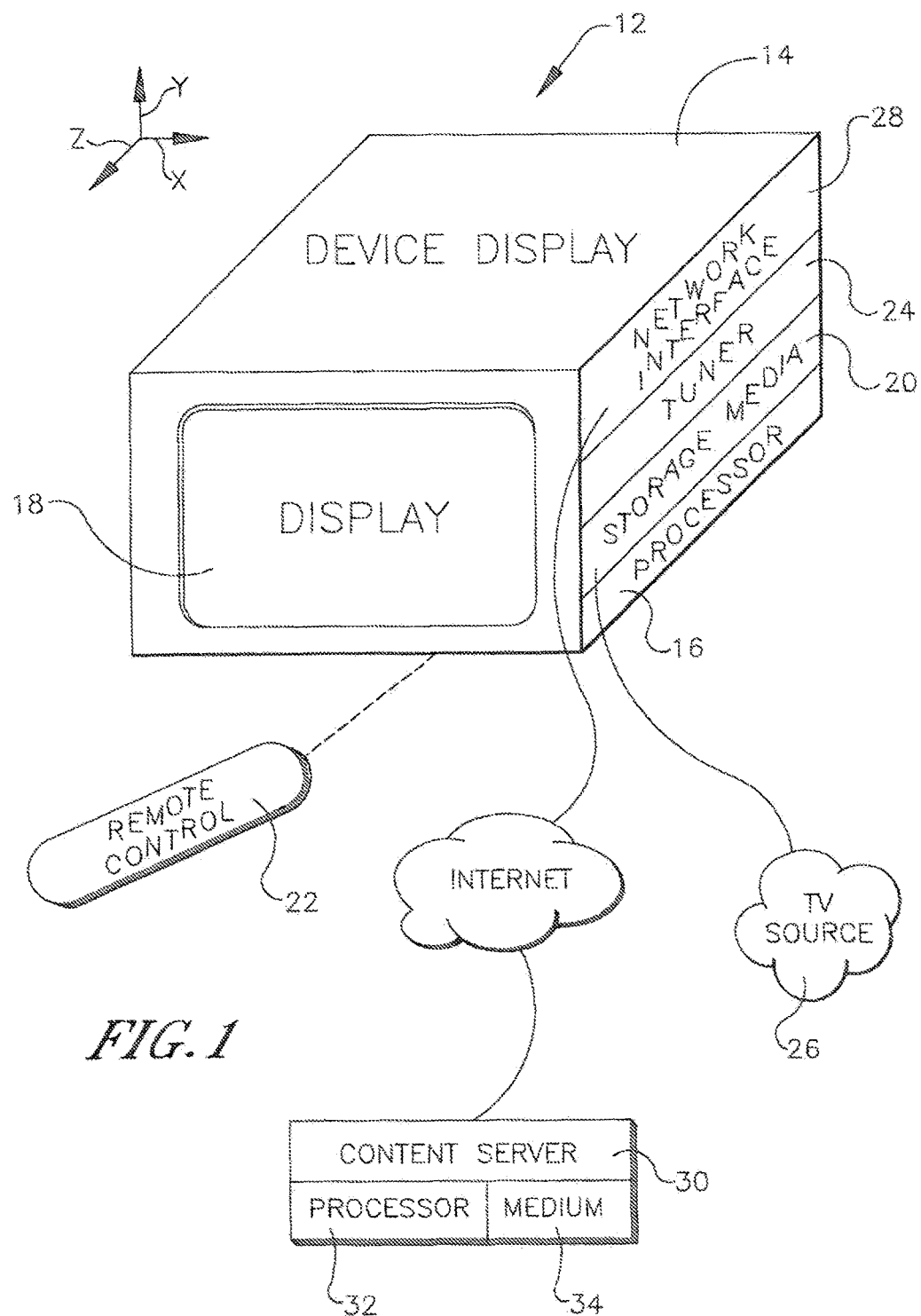
FIG. 1 is a block diagram of an example system in accordance with present principles.

Referring initially to FIG. 1, a three dimensional (3D) video display device 12 such as a TV, game player, camera, personal digital assistant, laptop computer, personal computer (PC), etc. includes a housing 14 bearing a digital processor 16. The processor 16 can control a visual display 18 and an audible display such as one or more speakers. The processor 16 may access a media player module such that the device 12 has media decoding capability.

To undertake present principles, the processor 16 may access one or more computer readable storage media 20 such as but not limited to RAM-based storage, a chip implementing dynamic random access memory (DRAM)) or flash memory or disk storage. Software code implementing present logic executable by the device 12 may be stored on one of the memories shown to undertake present principles.

The processor 16 can receive user input signals from various input devices, including a wireless remote control (RC) 22, a point and click device such as a mouse, a keypad, etc. A TV tuner 24 may be provided in some implementations particularly when the device is embodied by a TV to receive TV signals from a TV broadcast signal source 26 such as a set-top box, satellite receiver, cable head end, terrestrial TV signal antenna, etc. The TV tuner 24 may be implemented in a set top box separately housed from the TV and communicating therewith. In other embodiments, no TV tuner may be provided. Signals from the tuner 24 are sent to the processor 16 for presentation on the display 18 and speakers.

As shown in FIG. 1, a network interface 28 such as a wired and/or wireless modem may also be provided to enable the processor 16 to communicate with content servers 30 on the Internet (only one server 30 shown in FIG. 1 for clarity). The server 30 has a processor 32 and a tangible non-transitory computer readable storage medium 34 such as disk-based and/or solid state storage.

FIG. 1 also illustrates the three spatial axes defined by the display 18. As shown, the x-axis is defined by the left-to-right (width) dimension of the display, the y-axis is defined by the up-to-down (height) dimension of the display, and the z-axis is perpendicular to the plane of the display 18.

Figure 2:
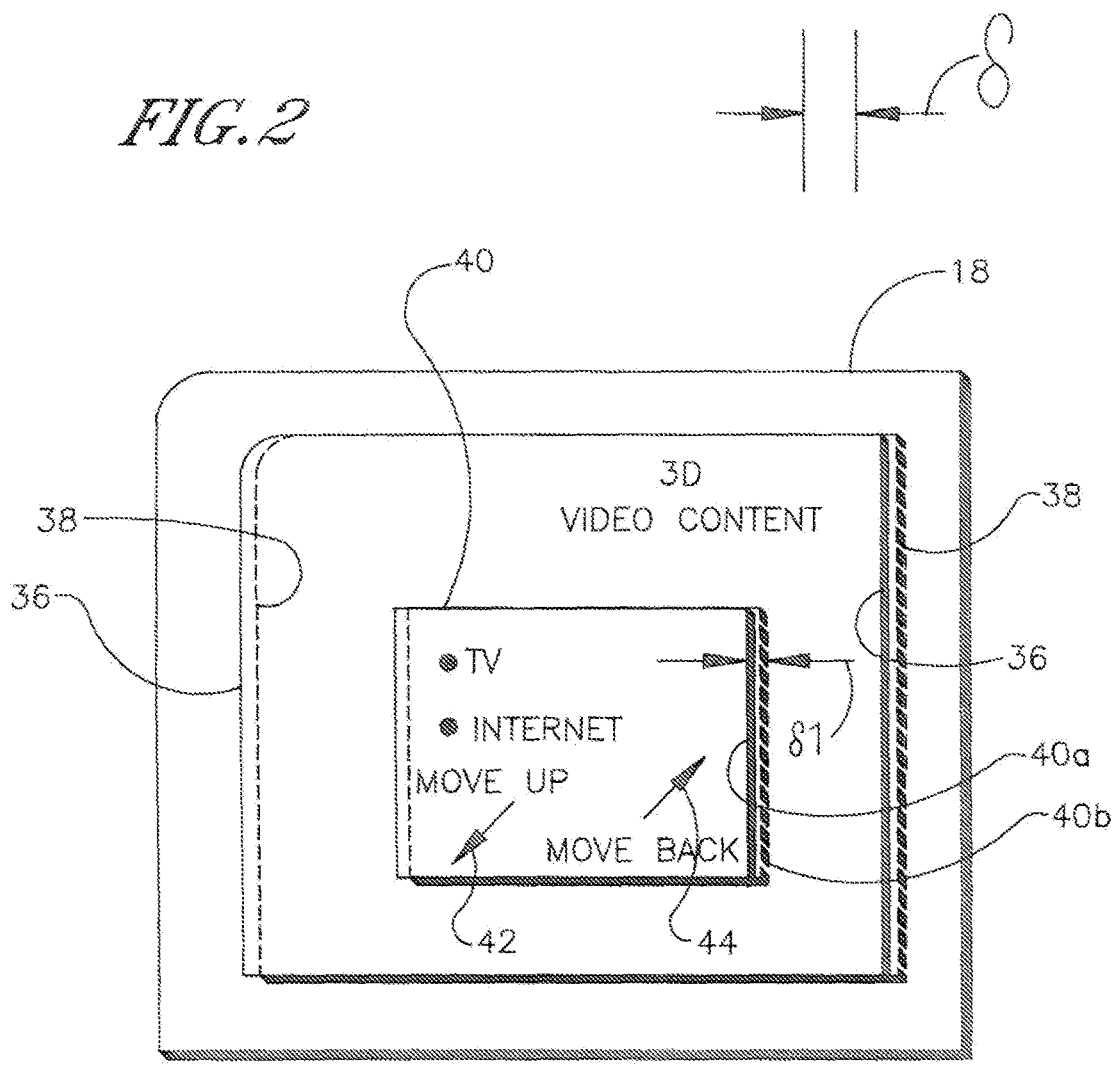
FIG. 2 is a screen shot of an example user interface (UI) in the graphics plane overlaid on 3D video content.
Figure 3:
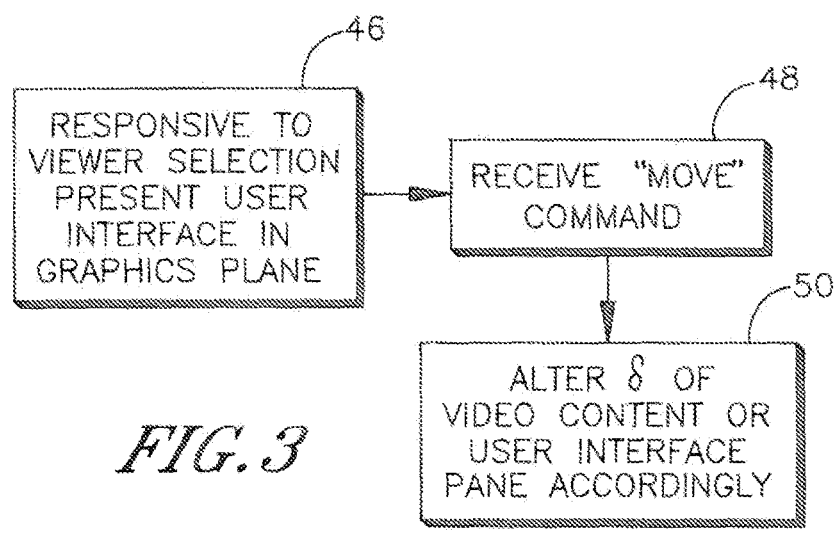
FIG. 3 is a flow chart of example logic for moving the UI along the z-axis which is perpendicular to the plane of the display.

Reference is now made to FIGS. 2 and 3. In the example shown in FIG. 2, 3D video content is presented on the display 18 by presenting two identical images 36, 38 of the content simultaneously which are offset from each other horizontally (along the x-axis) by a disparity "δ". Other methods for establishing 3D video may be used.

Also, a user input pane 40 is presented on the display overlaid on the 3D video content as shown. The UI pane 40 is presented in the graphics plane of the device 12. In the example shown the UI pane 40 is in 3D, although in some embodiments it could be presented in 2D. When the UI pane 40 is in 3D it is presented by presenting two identical images 40a, 40b which have an x-axis disparity "δ1" between them as shown and in accordance with principles discussed above.

In any case, the example UI shown in the pane 40 is for illustration a simple UI for enabling a viewer to select video input from between the TV tuner 24 and the network interface 28 but it is to be understood that the particular function of the UI in the pane 40 may vary and is not limiting.

As also shown in FIG. 2, one method for enabling a viewer to indicate whether to (virtually) move the UI pane 40 along the z-axis is the presentation in the UI pane 40 of a "move up" arrow 42 and a "move back" arrow 44, both of which may be labeled as such if desired as shown. A viewer may manipulate the RC 22 to move a cursor over the desired arrow 42, 44 and then select the desired movement by, e.g., clicking on a key of the RC 22.

In one embodiment, a single key click corresponds to an incremental unit of movement. Thus, if a "0" position correlates to the most distant (virtual) position along the z-axis and a "1" position correlates to the closest (virtual) position along the z-axis, a default location along the z-axis for the UI pane 40 might be at 0.5 and a single click can move the graphics plane forward (or back) by an increment of 0.05. The viewer can move the UI pane 40 in greater increments of distance along the z-axis by entering as many clicks as desired on the RC 22.

Additionally or in lieu of (virtually) moving the UI pane 40 along the z-axis by means of the above-described arrows, the RC 22 may be provided with "move up" and "move back" keys which, when toggled, send commands to the processor 16 to respectively cause the processor to move the UI pane 40 up or back along the z-axis.

FIG. 3 illustrates example logic which may be executed by the processor 16 responsive to the above-described structure. Commencing at block 46, responsive to a viewer selection of a user interface as indicated by, e.g., a signal from the RC 22, the processor 16 presents the UI pane 40 in the graphics plane of the display device 12, as shown in FIG. 2. At block 48 the processor receives a "move up" or "move back" command as described above and in response alters the disparity "δ" of either the video content images 36, 38 or, if the UI pane 40 is presented in 3D, the disparity "δ1" between the two images 40a, 40b of the UI presented in the graphics plane. Thus, responsive to a "move back" command consisting of a single click in the preceding example, the processor 16 reduces, by 5%, the disparity between the two images by moving one of the images closer to the other along the x-axis by an amount of 5% of the total range of disparity or less preferably by moving both images toward each other by an amount of 2.5% of the total range of disparity. Similarly, responsive to a "move up" command consisting of a single click in the preceding example, the processor 16 increase, by 5%, the disparity between the two images by moving one of the images away from the other along the x-axis by an amount of 5% of the total range of disparity or less preferably by moving both images away each other by an amount of 2.5% of the total range of disparity. Additional clicks cause the processor to decrease (or increase) the disparity responsive to the user input.

As an alternative to adjusting the disparity, the processor 16 can, responsive to a user "move back" command discussed above, increase the alpha blending of one of the two content images 36, 38. As understood herein, this reduces the 3D effect while graphics are being shown, alleviating eye strain while trying to view graphics in a 3D display.

Yet another way to reduce eye strain when viewing graphics in a 3D display is to increase the width of the UI pane 40 (i.e., in the x-dimension). The border area of the UI pane 40 may have an opacity gradient, so the transition is made as smooth as possible.

While the particular ESTABLISHING Z-AXIS LOCATION OF GRAPHICS PLANE IN 3D VIDEO DISPLAY is herein shown and described in detail, it is to be understood that the subject matter which is encompassed by the present invention is limited only by the claims.

What is claimed is:

1. Video display device comprising:
   processor;
   video display controlled by the processor, the video display defining a display plane and a z-axis perpendicular to the display plane;
   user input device communicating with the processor to send user selection signals to the processor;
   the processor executing logic comprising:
      responsive to a viewer selection of a user interface (UI), presenting a UI object in a graphics plane of the video display device, the UI object being rendered in 3D by presenting two identical overlapping images of the UI object separated from each other by disparity distance;
      responsive to a first command from the user input device, causing the UI object to appear to move in a first direction along the z-axis by increasing the disparity;
      responsive to a second command from the user input device, causing the UI object to appear to move in a second direction along the z-axis by decreasing the disparity, the first direction being opposite to the second direction.

2. The device of claim 1, wherein the first direction is toward a viewer of the display and the second direction is away from a viewer of the display.

3. The device of claim 1, wherein the first command is a "move up" command and the second command is a "move back" command.

4. The device of claim 1, wherein the images are video content images presented in a video plane of the device.

5. The device of claim 1, wherein the images are user interface images presented in a graphics plane of the device.

6. The device of claim 1, wherein the first and second commands cause the processor to cause the UI to appear to move incrementally in that the UI moves a fraction of a total distance available for movement of the UI along the z-axis responsive to a single command.

7. Video display device comprising:
processor;
video display controlled by the processor, the video display defining a display plane and a z-axis that extends out of the display plane;
user input device communicating with the processor to send user selection signals to the processor;
the processor executing logic comprising:
responsive to a viewer selection of a user interface (UI), presenting a UI object in a graphics plane of the video display device, the UI object being rendered in 3D by presenting two overlapping images of the UI object separated from each other by disparity distance;
responsive to a first command from the user input device, causing the UI object to appear to move in a first direction along the z-axis by increasing the disparity;
responsive to a second command from the user input device, causing the UI object to appear to move in a second direction along the z-axis by decreasing the disparity, the first direction being different than the second direction.

8. The device of claim 7, wherein the first direction is toward a viewer of the display and the second direction is away from a viewer of the display.

9. The device of claim 7, wherein the first command is a "move up" command and the second command is a "move back" command.

10. The device of claim 7, wherein the images are video content images presented in a video plane of the device.

11. The device of claim 7, wherein the images are user interface images presented in a graphics plane of the device.

12. The device of claim 7, wherein the first and second commands cause the processor to cause the UI to appear to move incrementally in that the UI moves a fraction of a total distance available for movement of the UI along the z-axis responsive to a single command.

* * * * *